(12) United States Patent
Adkins et al.

(10) Patent No.: US 12,224,575 B2
(45) Date of Patent: Feb. 11, 2025

(54) COORDINATING A SEQUENCE OF OPENING AND CLOSING OPERATIONS OF POLES IN A SOLID-STATE CIRCUIT BREAKER

(71) Applicant: ROCKWELL AUTOMATION TECHNOLOGIES, INC., Mayfield Heights, OH (US)

(72) Inventors: Kyle B. Adkins, Oak Creek, WI (US); Aiman Kerim, Aarau (CH); Juerg Merki, Aarau (CH); Randall S. Langer, Oak Creek, WI (US); Andrew E. Carlson, Franklin, WI (US); David Elmiger, Hitzkirch (CH)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 396 days.

(21) Appl. No.: 17/889,188

(22) Filed: Aug. 16, 2022

(65) Prior Publication Data
US 2024/0063630 A1 Feb. 22, 2024

(51) Int. Cl.
*H02H 3/26* (2006.01)
*H02H 1/00* (2006.01)
*H02H 3/04* (2006.01)

(52) U.S. Cl.
CPC .......... *H02H 3/265* (2013.01); *H02H 1/0007* (2013.01); *H02H 3/04* (2013.01)

(58) Field of Classification Search
CPC ........ H02H 3/265; H02H 1/0007; H02H 3/04; H02H 3/066; H01H 9/542
USPC ......................................................... 361/78
See application file for complete search history.

(56) References Cited

U.S. PATENT DOCUMENTS

| | | | |
|---|---|---|---|
| 8,742,767 B2 | 6/2014 | Messersmith et al. | |
| 9,880,223 B2 | 1/2018 | Messersmith et al. | |
| 10,276,321 B2 | 4/2019 | Kennedy et al. | |
| 10,541,530 B2 | 1/2020 | Kennedy et al. | |
| 10,630,069 B2 | 4/2020 | Kennedy et al. | |
| 10,784,061 B2 | 9/2020 | Kennedy et al. | |
| 10,804,692 B2 | 10/2020 | Kennedy et al. | |
| 10,811,867 B2 | 10/2020 | Kennedy et al. | |
| 10,896,790 B2 | 1/2021 | Kennedy et al. | |
| 10,896,791 B2 | 1/2021 | Kennedy et al. | |
| 11,037,749 B2 | 6/2021 | Kouroussis et al. | |
| 11,158,477 B2 | 10/2021 | Mazur et al. | |
| 2008/0266733 A1 | 10/2008 | O'Leary et al. | |
| 2011/0211288 A1* | 9/2011 | Koshizuka | H02H 9/002 361/91.1 |

(Continued)

OTHER PUBLICATIONS

Extended European Search Report for Application No. 23183321.1 mailed Mar. 4, 2024, 10 pages.

*Primary Examiner* — Dharti H Patel
(74) *Attorney, Agent, or Firm* — Fletcher Yoder, P.C.

(57) ABSTRACT

A method may include receiving, via at least one processor, a first set of data indicative of a fault being present and send a first signal to a breaker based on the first set of data. The first signal may cause the breaker to open a plurality of poles of the breaker. The method may then involve receiving a second set of data indicative of the fault being cleared and sending a second signal to the breaker based on the second set of data. The second signal may cause the breaker to close a first pole of the plurality of poles at a first time and close a second pole of the plurality of poles at a second time different from the first time.

20 Claims, 7 Drawing Sheets

(56) References Cited

U.S. PATENT DOCUMENTS

| | | |
|---|---|---|
| 2016/0134205 A1 | 5/2016 | Bock et al. |
| 2020/0203943 A1* | 6/2020 | Shen ...................... H02H 3/066 |
| 2020/0395739 A1 | 12/2020 | Santore et al. |
| 2020/0395748 A1 | 12/2020 | Miller et al. |
| 2021/0066013 A1 | 3/2021 | Kumar et al. |
| 2021/0126447 A1 | 4/2021 | Miller |
| 2021/0234361 A1* | 7/2021 | Zhou ........................ H02H 3/05 |
| 2021/0241989 A1 | 8/2021 | Kouroussis et al. |
| 2021/0265830 A1 | 8/2021 | Mazur et al. |
| 2023/0187923 A1* | 6/2023 | Lu ........................... H01H 9/54 |
| | | 361/93.1 |
| 2024/0223177 A1* | 7/2024 | Chen ................... H02H 3/0935 |

* cited by examiner

COORDINATING A SEQUENCE OF OPENING AND CLOSING OPERATIONS OF POLES IN A SOLID-STATE CIRCUIT BREAKER

BACKGROUND

The present disclosure relates generally to operations of circuit breakers in an industrial automation system. More specifically, the disclosure is related to reducing a likelihood of arc flash and/or reduce a severity of exposed incident energy in a solid-state circuit breaker.

In an industrial automation system, solid-state circuit breakers (SSCB) may provide a particular advantage by avoiding the use of mechanical switching to open or close a circuit. Reducing or eliminating use of mechanical switching may reduce a likelihood of arc flash and/or a severity of exposed incident energy if an arc flash were to occur. When occurrences of arc flash are reduced, reliability and lifespans of systems using solid-state circuit breakers may improve (e.g., increase).

During the closing sequence of the SSCB, the SSCB may encounter a short circuit event. In some breakers, all three phases may be closed simultaneously using three contactors. That is, each contactor corresponding to a phase in a three-phase power system may be closed at the same time. However, each closing contactor may experience different properties or issues (e.g., the short circuit current via the contact) as compared to other contactors connected to other poles. Traditional breakers often accounted for this uncertainty in their design (e.g., clearance) and faced space constraints or limitations based on these design considerations. As such, improved systems and methods directed towards accounting for different electrical properties that may be present on different poles may be useful.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a solid-state circuit breaker that may couple between a power supply and an electrical load, one or more sensors configured to measure one or more properties associated with the solid-state circuit breaker, the electrical load, the power supply, or any combination thereof, and a control system that may communicatively couple to the one or more sensors. The control system may receive a first set of data from the one or more sensors, such that the first set of data is received while the solid-state circuit breaker is open. The control system may then send a first signal to the solid-state circuit breaker based on the first set of data, such that the first signal is may cause the solid-state circuit breaker to turn on a first semiconductor device associated with a first pole in the solid-state circuit breaker at a first firing angle and turn on a second semiconductor device associated with a second pole in the solid-state circuit breaker at a second firing angle different from the first firing angle. The control system may then receive a second set of data from the one or more sensors after the first signal is sent to the solid-state circuit breaker and send a second signal to the solid-state circuit breaker based on the second set of data, such that the second signal is configured to cause the solid-state circuit breaker to turn off the first semiconductor device and the second semiconductor device.

In yet another embodiment, a method may include receive, via at least one processor, a first set of data indicative of a fault being present and send a first signal to a breaker based on the first set of data. The first signal may cause the breaker to open a plurality of poles of the breaker. The method may then involve receiving a second set of data indicative of the fault being cleared and sending a second signal to the breaker based on the second set of data. The second signal may cause the breaker to close a first pole of the plurality of poles at a first time and close a second pole of the plurality of poles at a second time different from the first time.

In a further embodiment, a non-transitory, machine-readable medium may include machine-readable instructions that, when executed by one or more processors, cause the one or more processors to receive a first set of data indicative of a fault being present and send a first signal to a breaker based on the first set of data. The first signal may cause the breaker to open a plurality of poles of the breaker. The processors may then receive a second set of data indicative of the fault being cleared and send a second signal to the breaker based on the second set of data. The second signal may cause the breaker to close a first pole of the plurality of poles at a first time and close a second pole of the plurality of poles at a second time different from the first time.

DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiment of the present disclosure, the articles "a," "an," "the," and "said" are intended to mean that there are one or more of these elements. The terms "comprising," "including," and "having" are intended to be inclusive and mean that there may be additional elements other than the listed elements.

As described above, solid-state circuit breakers (SSCB) in safety systems may provide a particular advantage by avoiding the use of mechanical switching to open or close a circuit. Reducing or eliminating use of mechanical switching may reduce a likelihood of arc flash and/or a severity of exposed incident energy if an arc flash were to occur. When occurrences of arc flash are reduced, reliability and lifespans of systems using solid-state circuit breakers may improve (e.g., increase). Furthermore, since a likelihood of arc flash may be eliminated and/or reduced when using a solid-state circuit breaker, operators of solid-state circuit breakers may reduce a level of personal protective equipment (PPE) worn while operating the solid-state circuit breakers, such as the level of PPE worn when restarting (e.g., coupling line-side (or supply-side) to load-side, coupling supply-side to load-side) the SSCB after a trip event of the SSCB.

By way of example, during a closing sequence of a three-phase SSCB, the SSCB or a processor that operates the SSCB may detect a short circuit event. In some cases, the SSCB may close all three phases of a three-phase voltage system simultaneously using three contactors. That is, each contactor corresponding to a phase in a three-phase power system may be closed at the same time. However, each closing contactor may experience different electrical properties or issues (e.g., short circuit current experienced by the contactor) as compared to other contactors.

With the foregoing in mind, the embodiments described herein may include controlling individual contactors during the closing sequence of the SSCB during a short circuit event to coordinate the closing sequences with particular closing times and angles of a respective waveform (e.g., current and/or voltage). As a result, the SSCB may experience a lowered amount of available short circuit current for the first half cycle (i.e., before the first current zero cross) of an electrical waveform for a particular phase, as compared to simultaneously closing the three contactors. That is, by controlling individual contactors in accordance with embodiments described herein, the SSCB may significantly reduce an amount of available short circuit current for the first half cycle (i.e., before the first current zero cross) for a particular phase, thus limiting the amount of overcurrent provided to downstream devices, conducted by the SSCB, and the like.

It should be noted that the embodiments described herein may apply to both traditional electro-mechanical breakers and SSCBs. That is, in an electro-mechanical breaker, the available arc current may be reduced if the contactors can be opened during the first half-cycle of current waveform. Furthermore, the SSCB may further reduce the available arc current by employing semi-conductors to switch off, thereby breaking the current path faster than mechanical counterparts. Moreover, the transient recovery voltage across the semiconductors may be controlled/minimized, thereby providing additional protection as compared to the electro-mechanical breaker.

In some embodiments, the SSCB may be capable of measuring current and voltage. These measurements may be used to perform diagnostic operations using the coordinated closings of phases at the zero-crossing of the respective AC waveform to limit a maximum amount of current that may be available to downstream devices in which a fault may be present. By way of example, the SSCB may detect whether a short circuit condition is present after the SSCB performs a sniff operation (e.g., measurement) by closing one contactor and measuring electrical properties of the respective pole for a period of time. In some embodiments, if the SSCB detects that a line voltage has decreased below a threshold value or is decreasing at a rate that is higher than a threshold within a certain amount of time, the SSCB may be opened to avoid damage to downstream devices.

Moreover, after detecting a fault condition and opening the SSCB, the SSCB may pulse current back to downstream devices prior to closing the SSCB by closing and re-opening the SSCB to verify that the fault condition (e.g., short circuit) is no longer present. As such, the SSCB may avoid connecting downstream devices to a fault current or over voltage condition if the fault condition has not been resolved.

In some multi-phase operations, any number of contactors of the SSCB may be closed to perform sniff operations. That is, after a fault is detected and believed to be cleared, the SSCB may close the circuit again with one or more contactors. As such, the other phases may not close, thereby limiting the amount of current that may be available to downstream devices. Over time, the sniffing operations performed on multi-phase SSCBs may be performed using different phases to limit the wear on any particular phase or semiconducting device.

In some embodiments, the semiconductor devices in the SSCB may be closed for a short duration to evaluate the change in current (e.g., di/dt) during the close operation. If the change in current is greater than a threshold value, the SSCB may open the respective circuit to further limit the current or energy going into the short circuit. The close or ping operation may also be performed in multi-phase SSCB s after it is determined that a fault is not present in the first two phases after they are closed at or near the zero-crossing. Additionally, the close operations for multi-phase SSCBs may be sequenced such that each phase pair may be closed together for short durations to verify whether phase-to-phase faults are present. In this way, each phase may be protected from fault conditions.

As a result of performing one or more of the above techniques, the heatsinks connected to the SSCB may be reduced in size in light of the various manners in which the current is controlled through the SSCB. That is, the SSCB may control the amount of current that may be available to downstream devices during a fault and the SSCB may limit the number of poles that are closed during a fault condition. Each of these measures may result in a reduced maximum current that may be conducted via the SSCB, thereby reducing the amount of heat conducted by the respective semiconductor devices and allowing for smaller heatsinks.

Figure 1:
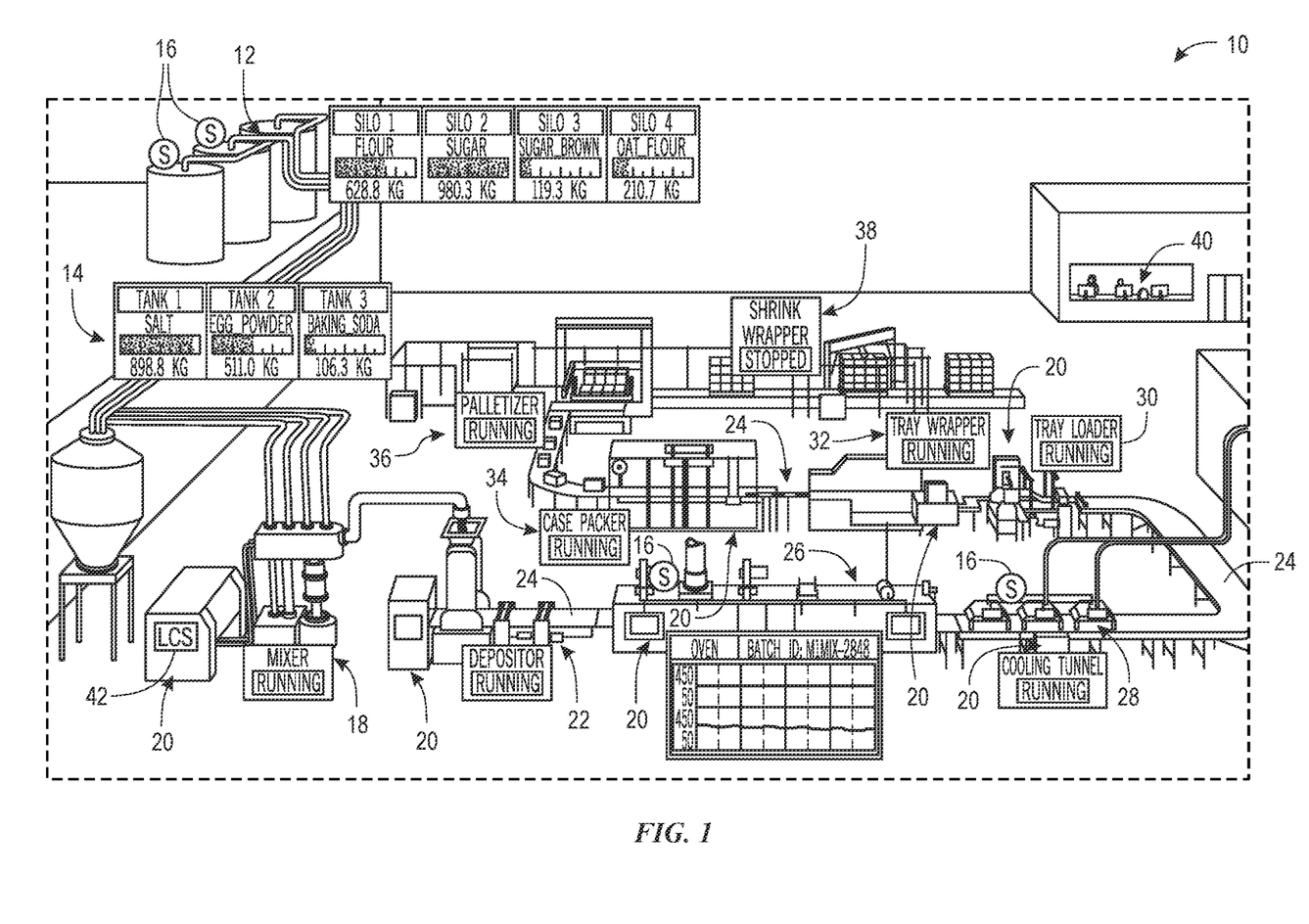
FIG. 1 illustrates an example industrial automation system, in accordance with embodiments presented herein.

With the foregoing in mind, FIG. 1 illustrates an example industrial automation system 10 employed by a food manufacturer in which the present embodiments described herein may be implemented. It should be noted that although the example industrial automation system 10 of FIG. 1 is directed at a food manufacturer, the present embodiments described herein may be employed within any suitable industry, such as automotive, mining, hydrocarbon production, manufacturing, and the like. That is, the following brief description of the example industrial automation system 10 employed by the food manufacturer is provided herein to help facilitate a more comprehensive understanding of how the embodiments described herein may be applied to industrial devices to significantly improve the operations of the respective industrial automation system based on the current configuration of the equipment in the industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals and preservatives. In some embodiments, sensors 16 may be positioned within or around the silos 12, the tanks 14, or other suitable locations within the example industrial automation system 10 to measure certain properties, such as temperature, mass, volume, pressure, humidity, and the like.

The raw materials be provided to a mixer 18, which may mix the raw materials together according to a specified ratio. The mixer 18 and other machines in the example industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, sensor, actuator, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the example industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may be used to provide power to the machinery used to perform certain tasks, provide protection to the machinery from electrical surges, prevent injuries from occurring with human operators in the example industrial automation system 10, monitor the operations of the respective device, communicate data regarding the respective device to a supervisory control system 40, and the like. In some embodiments, each industrial automation device 20 or a group of industrial automation devices 20 may be controlled using a local control system 42. The local control system 42 may include receive data regarding the operation of the respective industrial automation device 20, other industrial automation devices 20, user inputs, and other suitable inputs to control the operations of the respective industrial automation device(s) 20.

The local control system 42 may have access to configuration data associated with the connected industrial automation devices 20. That is, the local control system 42 may include memory or a storage component that stores information concerning the configuration of each industrial automation device 20 connected to it. In some embodiments, the information or configuration data may be populated or input by an operator at the time the respective industrial automation device 20 is installed. Additionally, the local control system 42 may query the connected industrial automation device 20 to retrieve configuration data, such as model number, serial number, firmware revision, assembly profile, and the like. In some embodiments, the supervisory control system 40 may collect configuration data from multiple local control systems 42 and store the information in a suitable memory or storage component.

Figure 2:
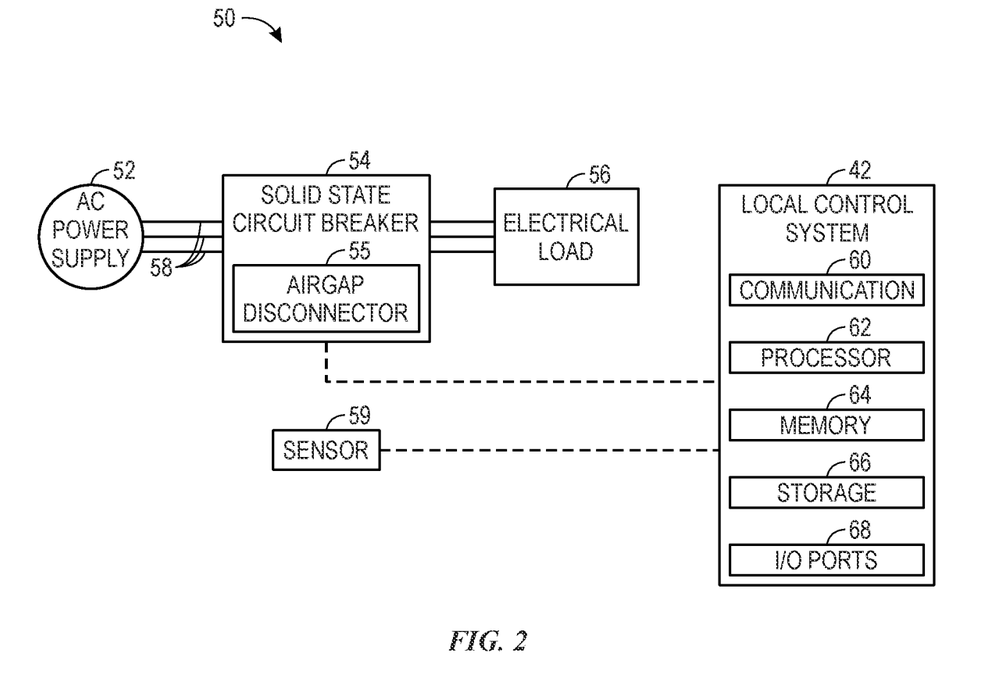
FIG. 2 is a block diagram of a load-feeder system in the industrial automation system of FIG. 1 protected by a solid-state circuit breaker, in accordance with an embodiment.

With the foregoing in mind, FIG. 2 is a block diagram of a feeder system 50 (e.g., motor feeder system, motor control center (MCC) feeder system), which may be part of the industrial automation system 10. The feeder system 50 may include a power supply, such as an alternating current (AC) power supply 52, to supply power to loads coupled downstream. The feeder system 50 may also include a solid-state circuit breaker 54 coupled to the AC power supply 52. The AC power supply 52 may supply current and/or voltage to an electrical load 56 via the solid-state circuit breaker 54.

The feeder system 50 may be designed to use solid-state circuit breakers 54 compatible with three-phase (e.g., multi-phase) electrical distribution systems. The solid-state circuit breakers 54 may be used as an independent electrical feeder (e.g., main line) and/or as a motor starter, in combination with additional solid-state circuit breakers 54 as a motor starter, and/or in similar operation as a non-solid-state circuit breaker. As such, the solid-state circuit breaker 54 may be suitable for protection of electrical couplings between the power supply 52 for a motor and the motor (e.g., feeder between a generator and a motor as depicted in FIG. 2), as well as for protection of electrical couplings between an inverter and a motor. When using the solid-state circuit breaker 54 as a motor starter, the solid-state circuit breaker 5 4 may be operated to perform a reverse starting operation, a non-reverse (e.g., forward) starting operation, a soft-start starting operation (e.g., stepped starting operation), and the like.

In some cases, a motor starter may include a galvanic disconnecting device with branch circuit protection (e.g., a circuit breaker, fused disconnect switch), a thermal overload protection device (e.g., electronic overload), and an isolating device in the form of a contactor. These three components work together as a starter assembly for a motor load (e.g., electric motor circuit), such as a full voltage non-reversing starter system. For example, each disconnect switch in a starter may operate at a same time to open or close the electrical circuit to the motor load.

In the industrial automation system 10, the starter described above (e.g., full voltage non-reversing starter) may be replaced by a starter that uses semiconductors (e.g., SiC semiconductors) to improve operation of the starter without semiconductors. For example, the electronic overload device and isolation switch between line-side (e.g., supply-side) and load-side of the above-referenced starter (e.g., contactor functionality) may be embedded within the solid-state circuit breaker 54 as a single component. These components, embedded into the solid-state circuit breaker 54, may eliminate the contactor and overload components.

In some embodiments, the solid-state circuit breaker 54 may include an airgap disconnector 55. The airgap disconnector 55 may permit galvanic isolation between line-side and load-side within the solid-state circuit breaker 54, as opposed to in line with the solid-state circuit breaker 54. Control circuitry of the solid-state circuit breaker 54 may utilize the airgap disconnector 55 to perform lockout/tagout control operations. The galvanic isolation protection provided within the solid-state circuit breaker 54 may be further supplemented by including an additional circuit breaker and/or fused disconnect switch upstream of the solid-state circuit breaker 54, such as to further decouple the solid-state circuit breaker 54 from a portion of a circuit. In some cases, the solid-state circuit breaker 54 may be associated with a latch mechanism that interlocks the solid-state circuit breaker 54. Interlocking the solid-state circuit breaker 54 may stop an operator from removing the solid-state circuit breaker 54 while the solid-state circuit breaker 54 is closed.

In some embodiments, a mechanical device may be included within the solid-state circuit breaker 54 to operate a galvanic disconnecting device within the solid-state circuit breaker 54 additional to or alternative of the latch mechanism and/or the fused disconnect switch. Operating the galvanic disconnecting device into an open position (e.g., such that an air gap is present between metal contactors associated with a line-side and a load-side of the solid-state circuit breaker 54) may provide mechanical galvanic isolation. It is noted that in some cases the galvanic disconnecting device implements or is the integrated air-gap disconnect. The mechanical device may be installed and attached to a physical disconnect handle that extends to the outside of a motor control center unit or drawer. Operating the physical disconnect handle to cause the mechanical device to operate the galvanic disconnecting device may provide a way to physically decouple a supply-side from a load-side of the solid-state circuit breaker. Physically decoupling the supply-side from the load-side of the solid-state circuit breaker 54 may reduce a likelihood of arcs occurring during the removal of the solid-state circuit breaker 54 and/or may be desired in certain maintenance operations and/or for unit withdrawal, such as to comply with the various electrical governing bodies standards and/or when additional isolation of the solid-state circuit breaker 54 from an electrical supply is desired.

When abnormal operation occurs, such as when a voltage that is uncharacteristically high or low is delivered to the electrical load 56, the solid-state circuit breaker 54 may electronically disconnect the AC power supply 52 from the electrical load 56. As such, the solid-state circuit breaker 54 may protect the electrical load from supply voltages and/or supply currents that may damage the solid-state circuit breaker 54.

Any suitable number of supply devices may be represented by the AC power supply 52, such as any combination of rectifiers, converters, power banks, generation devices, or the like. It should be understood that the feeder system 50 may include one or more motor-drive systems, motors, MCCs, or the like as the electrical load, or coupled between any of the depicted devices and that the feeder system 50 may include one or more additional components not depicted in FIG. 1.

For example, the feeder system 50 may include any suitable type of rectifier device that includes a number of switches controllable by any suitable power converter. For example, the AC power supply 52 may include an active front end (AFE) converter, a diode converter, a thyristor converter, a diode front end rectifier, or the like. In some embodiments, the switches of the AC power supply 52 may be semiconductor-controlled devices, transistor-based (e.g., insulated-gate bipolar transistor (IGBT), metal-oxide semiconductor field-effect transistor (MOSFET), or other suitable transistor) devices, or other suitable devices in which the opening and/or closing of the switch may be controlled using an external signal (e.g., gate signal), which may be provided by the local control system 42. The AC power supply 52 may provide AC supply signals (e.g., AC voltage, AC current, a regulated AC output) on a bus 58, which may be provided to the solid-state circuit breaker 54.

It is noted that the feeder system 50 may be used in a variety of industrial automation systems, such as food manufacturing, industrial operations systems, refineries, or the like. In this way, implementation and use of the solid-state circuit breaker 54 to protect various electrical loads may improve operations of industrial automation systems. For example, using a solid-state circuit breaker 54 may reduce or eliminate usage of electrical protection devices that rely at least partially on mechanical switching. Reducing or eliminating use of mechanical switching may reduce a likelihood of arc flash and/or reduce a severity of exposed incident energy if an arc flash were to occur. When occurrences of arc flash are reduced, reliability and lifespans of systems using solid-state circuit breakers 54 may improve (e.g., increase) and operators may reduce a level of personal protective equipment (PPE) worn while operating nearby to the solid-state circuit breaker 54.

The solid-state circuit breaker 54 may be coupled to one or more sensors 59. The one or more sensors 59 may include temperature sensors, current sensors, voltage sensors, or any other viable sensor that may detect and/or record data about the solid-state circuit breaker 54. The temperature sensor may include a thermistor, a thermocouple, a resistance temperature detector, or any other temperature sensor suitable for detecting temperature of the solid-state circuit breaker 54. In some embodiments, the one or more sensors 59 may be coupled to the bus 58.

Industrial automation systems may operate in response to signals generated by the local control system 42. The local control system 42 may include any suitable number of electronic devices and/or components to generate and/or manage generation of the control signals. For example, the local control system 42 may include a communication component 60, a processor 62, a memory 64, storage 66, and input/output (I/O) ports 68, or the like, for generating and managing generation of control signals.

The communication component 60 may be a wireless or wired communication component that facilitates communication between the local control system 42, the solid-state circuit breaker 54, or other suitable electronic devices. The processor 62 may be any type of computer processor or microprocessor capable of executing computer-executable code. The memory 64 and the storage 66 may be any suitable articles of manufacture that may serve as media to store processor-executable code, data, or the like. These articles of manufacture may represent computer-readable media (i.e., any suitable form of memory or storage) that may store the processor-executable code used by the processor 62 to perform the presently disclosed techniques, such as to predictively response to operational changes, or the like.

The I/O ports 68 may couple to the one or more sensors 59, one or more input devices, one or more displays, or the like, to facilitate human or machine interaction with the local control system 42, the solid-state circuit breaker 54, or other suitable electronic devices. For example, based on a notification provided to the operator via a display, the operator may use an input device to instruct the adjustment of a parameter associated with the solid-state circuit breaker 54.

Keeping the foregoing in mind, sometimes the local control system 42 may communicate with the solid-state circuit breaker 54 using one or more communication techniques. For example, the solid-state circuit breaker 54 may include a controller area network (CAN) communicative coupling and/or an internet protocol (IP)-based communicative coupling, such as an Ethernet IP communicative coupling, to the local control system 42. These communicative couplings may enable the solid-state circuit breaker 54 to communicate with the local control system 42 without intervention from a host computer. Thus, the solid-state circuit breaker 54 may communicate directly with the local control system 42 without using an intervening computing device.

In some cases, the local control system 42 may use one or more configuration interfaces to communicate with the solid-state circuit breaker 54. The configuration interface may be a graphical user interface and/or logically-defined data object (e.g., data table) that permits the local control system 42 and/or user to provide and/or update a configuration and/or to obtain a status of the solid-state circuit breaker. In this way, the configuration interface may be a data boundary used to translate configurations from devices external to the solid-state circuit breaker 54 to a format readable by the solid-state circuit breaker 54 and/or to translate statuses from the solid-state circuit breaker 54 into a format readable by devices external to the solid-state circuit breaker 54.

With this in mind, the local control system 42 may use the configuration interface-based communication techniques to instruct the solid-state circuit breaker 54 into a particular mode of operation. The mode of operation may define how signals are transmitted through or from the solid-state circuit breaker 54. For example, the solid-state circuit breaker 54 may be instructed into a soft-start operational mode, a forward operational mode, and/or a reverse operational mode, and thus may behave like a motor starter. In some cases, the solid-state circuit breaker 54 may be operated in combination with one or more additional solid-state circuit breakers 54 also operated into the same operational mode. The soft-start operational mode may cause the solid-state circuit breaker 54 to provide incrementally-generated supply power or supply signals to the electrical load 56, such as to provide a start-up level of supply signals at a relatively gradual pacing or timing. The forward operational mode may cause the solid-state circuit breaker 54 to provide supply power in a way to cause the electrical load to operate in a forward direction relative to a reference direction, while the reverse operational mode may cause the solid-state circuit breaker 54 to provide supply power in a way as to cause the electrical load to operate in a reverse direction relative to the reference direction.

The local control system 42 may also permit configuration of properties of the solid-state circuit breaker 54 based at least in part on thermal measurements and/or metering information, such as phase-phase voltages, phase-to-ground voltages, input current, output current, frequency, power, status of the solid-state circuit breaker 54 (e.g., Open, Close, Blocked, Failure), or the like. In this way, the local control system 42 may determine a current operation of the solid-state circuit breaker 54 and use the information of the current operation to determine how to adjust an operation of the solid-state circuit breaker 54. For example, the local control system 42 may determine that the solid-state circuit breaker 54 is blocked and has a thermal measurement higher than a historical average for the solid-state circuit breaker 54. Using this information, the local control system 42 may determine that an undesired operation is occurring, and thus may determine to open the solid-state circuit breaker 54. Furthermore, the local control system 42 may use this information to operation other devices upstream and/or downstream of the solid-state circuit breaker 54, such as controlling additional protection circuitry to further isolate the solid-state circuit breaker 54 from the industrial automation system.

The properties, in some embodiments, may also be used to define operation limits corresponding to determined settings to be used to protect the load. The operation limits may correspond to operating ranges set by governing agencies or standard committees, such as American National Standards Institute (ANSI®), Underwriters Laboratories (UL®), International Electrotechnical Commission (IEC®) or the like and may be used to protect the solid-state circuit breaker 54, the electrical load 56, or the like from undesired operating conditions.

Furthermore, the properties may also define protection groups or classes associated with the solid-state circuit breaker 54. Protection groups or classes may correspond to groups of electrical loads 56 that may have a same protection scheme. These protection groups or classes may be classifications of types of protection for different devices set by governing agencies or standard committees. When the electrical load 56 is classified as part of a protection group with another electrical load 56, it may be desired to protect both electrical loads 56 with a solid-state circuit breaker 54 set to the same settings. In this way, when a different electrical load 56 is installed to the solid-state circuit breaker 54, the protection groups or classes may be updated to indicate the new group or class of the new electrical load 56. This may cause the solid-state circuit breaker 54 to automatically update its operational settings to accommodate the new electrical load 56.

Use of properties may thus improve deployment of setting changes to solid-state circuit breakers 54 by making an overall installation process of a new electrical load 56 relatively faster since less time is spent updating operational settings of the solid-state circuit breaker 54. In some embodiments, the solid-state circuit breaker 54 may detect a protection group or class of its electrical load 56 automatically and/or without receiving the property from the local control system 42. In these cases, the solid-state circuit breaker 54 may sense metering information (e.g., operational properties) of the electrical load 56 to determine what protection group or class applies to the electrical load 56. For example, the solid-state circuit breaker 54 may determine that it outputs three-phase power and that its load is operating at a relatively high voltage that corresponds to an operating voltage of a large motor load, thus the solid-state circuit breaker 54 may automatically classify its electrical load 56 as a large motor based on this analysis.

In some cases, the local control system 42 may use configuration interface techniques to receive thermal measurements and/or metering information directly from the solid-state circuit breaker 54. For example, the solid-state circuit breaker 54 may directly report values sensed by one or more measurement circuitries coupled to one or more portions of the solid-state circuit breaker 54 via updating of data stored in a table, data object, or the like, associated with the configuration interface between the solid-state circuit breaker 54 and the local control system 42. As such, the solid-state circuit breaker 54 may report its sensed values including, but not limited to, ambient temperature, internal temperature, phase-to-phase voltage, internal voltage, phase-to-line voltage, current, frequency, power input, power output, or the like. Furthermore, in some cases, the solid-state circuit breaker 54 may report its status, such as whether it is operated in an open state (e.g., Open status), a closed state (e.g., Closed status), whether its closing/opening function is blocked and/or functionally prevented (e.g., Blocked status), and/or whether the solid-state circuit breaker 54 is non-operational and/or uncommunicative (e.g., offline) in the same data object associated with the configuration interface.

These various statuses, control operations, and other datasets may be communicated between the local control system 42 and the solid-state circuit breaker 54 using any suitable communication or programming technique. For example, additional devices, such as the local control system 42, may interface in real-time with the solid-state circuit breaker 54 using direct IEC® 61131 programming techniques and/or supporting programming languages, such as structured text, ladder logic, sequential function chart, functional block programming, or the like. It is noted that in some cases, the solid-state circuit breaker 54 may retain and/or generate an information log (e.g., such as within the storage 66) that may be reported to at a later time to the local control system 42. The information log may store and/or track various alarm states, alerts, operations, sensed values, statuses, or the like generated by the solid-state circuit breaker 54.

As discussed above, when performing a close operation, the solid-state circuit breaker 54 may inadvertently close into a short circuit event, thereby risking damage to equipment in the industrial automation system 10. That is, if the solid-state circuit breaker 54 closes all three phases of a three-phase voltage system simultaneously while a short circuit event is present on the solid-state circuit breaker 54, the connected equipment may experience or be coupled to the same short circuit event. However, each closing contactor may experience varying levels of voltage and current (e.g., short circuit current experienced by the contactor) as compared to other contactors.

Figure 3A:
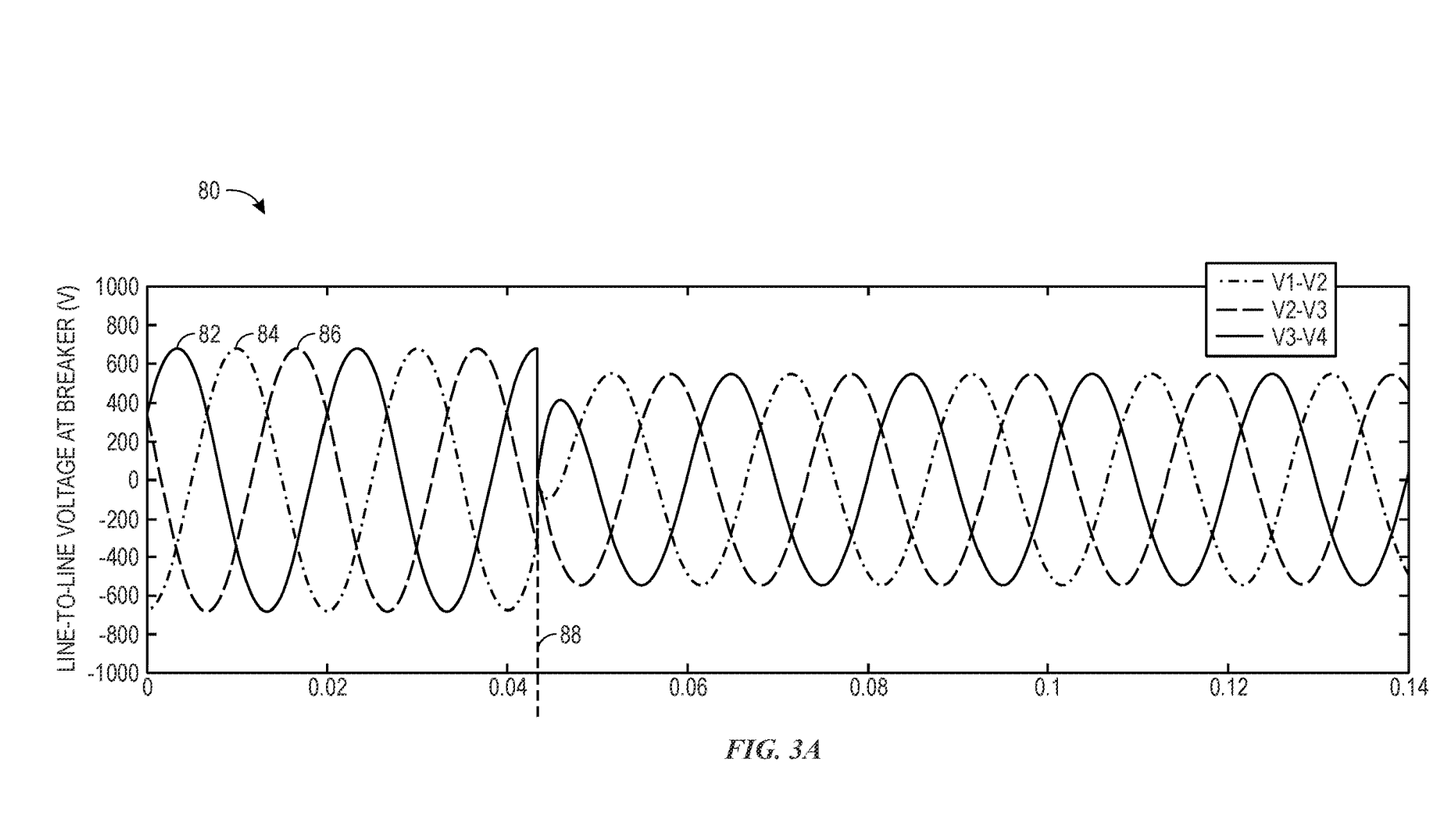
FIGS. 3A and 3B illustrates voltage and current waveforms the solid-state circuit breaker during a closing operation, in accordance with an embodiment.
Figure 3B:
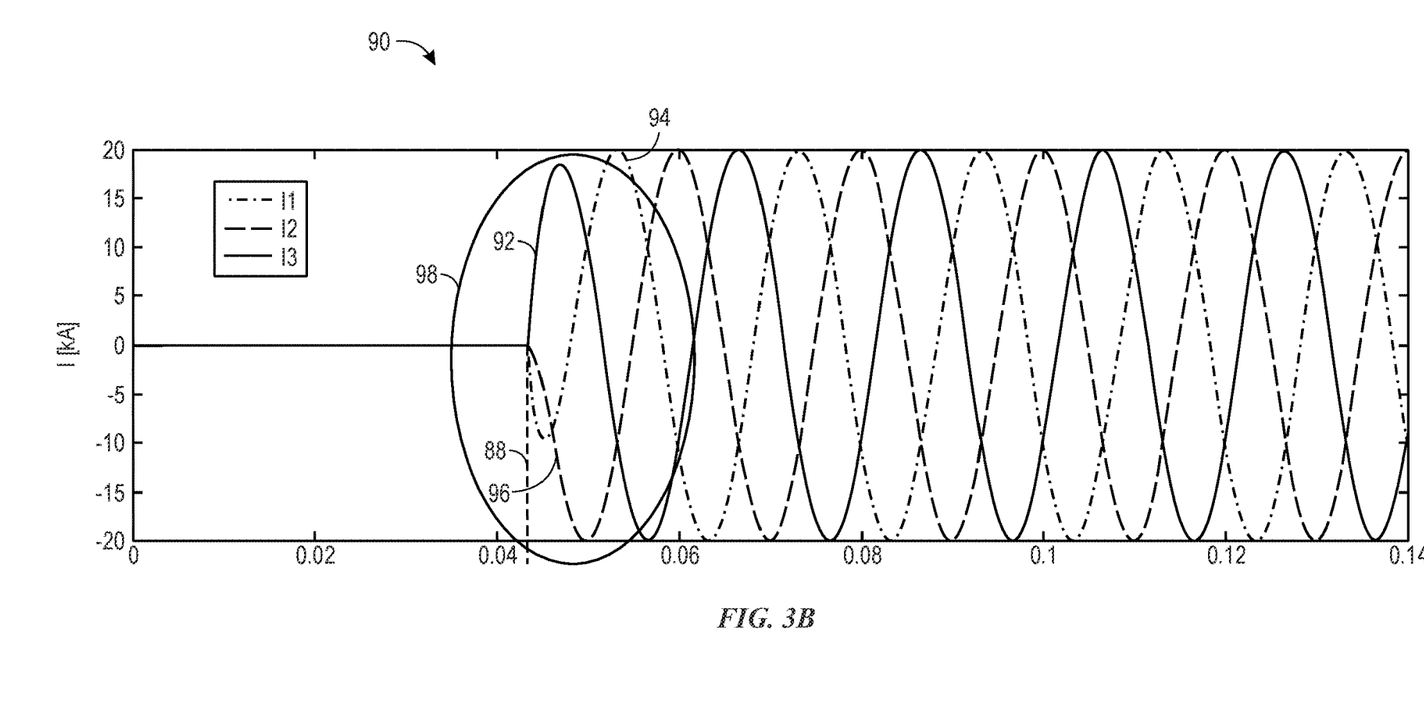

With the foregoing in mind, FIGS. 3A and 3B illustrates a voltage and current measurements of three poles within the solid-state circuit breaker 54 as measured while performing a closing operation between three poles of the solid-state circuit breaker 54 during a short circuit event. In particular, graphs 80 and 90 depict voltage and current measurements during a close operation in which each of the multi-pole switches of the solid-state circuit breaker 54 are closed at substantially the same time. Referring first to the graph 80 of FIG. 3A, the graph 80 illustrates a voltage curve with respect to time. Specifically, the voltage curves 82, 84, and 86 depicted in the graph 80 represent line-to-line voltages between poles of the solid-state circuit breaker 54. As mentioned above, the graph 80 may illustrate a voltage measurement between each phase or pole of the solid-state circuit breaker 54 while performing a close operation during a short circuit event. That is, the solid-state circuit breaker 54 may be actively closing connecting downstream equipment to a power supply via multiple poles within the solid-state circuit breaker 54 while a short circuit event is present in the power supply, the downstream equipment, or both.

Each pole of the solid-state circuit breaker 54 may experience a different voltage during the short circuit event. As illustrated by the graph 90 of FIG. 3B, each pole of the solid-state circuit breaker 54 is open and not conducting current until time 88. At time 88, the solid-state circuit breaker 54 may close into short circuit event, which may be present in a downstream component and/or an upstream component coupled to the solid-state circuit breaker 54. Following the time 88, the voltage curve 82 that corresponds to the line-to-line voltage between two poles (e.g., V3-V1), the voltage curve 84 (e.g., V1-V2), and the voltage curve 86 (e.g., V2-V3) may be altered due to the connected load and the short circuit event.

In the same manner, the graph 90 illustrates the corresponding current curves 92, 94, and 96 that are related to respective poles of the solid-state circuit breaker 54. As illustrated in the graph 90, each pole of the solid-state circuit breaker 54 may experience varying amounts of current during the closing sequence of the solid-state circuit breaker 54. By way of example, the first current curve 92 may experience a first current peak amplitude via the solid-state circuit breaker 54, the second current curve 94 may experience a second peak amplitude current for the second pole of the solid-state circuit breaker 54, and the third current curve 96 may experience a third peak current amplitude via the solid-state circuit breaker 54 during a first half-cycle of each respective current waveform. As such, if the short circuit event is detected after time 88 and each pole of the solid-state circuit breaker 54 opens within the first half-cycle of the respective current waveform, each pole still experiences varying amounts of current flow immediately following the short circuit event, which may lead to varying types of damage to each pole or connected device over time as the solid-state circuit breaker 54 closes into the short circuit event. That is, current profiles of each pole of the solid-state circuit breaker 54 may be asymmetric for each phase in the three-phase voltage system. This may lead to nondeterministic opening profiles that vary significantly based on the phase angle of the short circuit event.

Thus, if the individual poles of the solid-state circuit breaker 54 are controlled to open within a half-cycle after the closing sequence of the solid-state circuit breaker 54 is initiated (e.g., time 88), the available short circuit current to downstream devices in region 98 may still be close to the peak current of the short circuit event. With this in mind, it may be beneficial to use particular closing times coordinated with firing angles of a respective waveform (e.g., current and/or voltage) to significantly reduce an amount of available short circuit current that may be present for the first half cycle (i.e., before the first current zero cross) of a particular phase. That is, the solid-state circuit breaker 54 may initially close each pole at different times according to different firing angles to determine whether a short circuit event is present. If the short circuit or other fault event is detected, the solid-state circuit breaker 54 may react within a half-cycle to open the respective poles. By closing the poles at different times, the solid-state circuit breaker 54 may limit the available short circuit current available to downstream devices, thereby preserving the integrity of the downstream devices and the internal components (e.g., semiconductor devices) within the solid-state circuit breaker 54.

Figure 4:
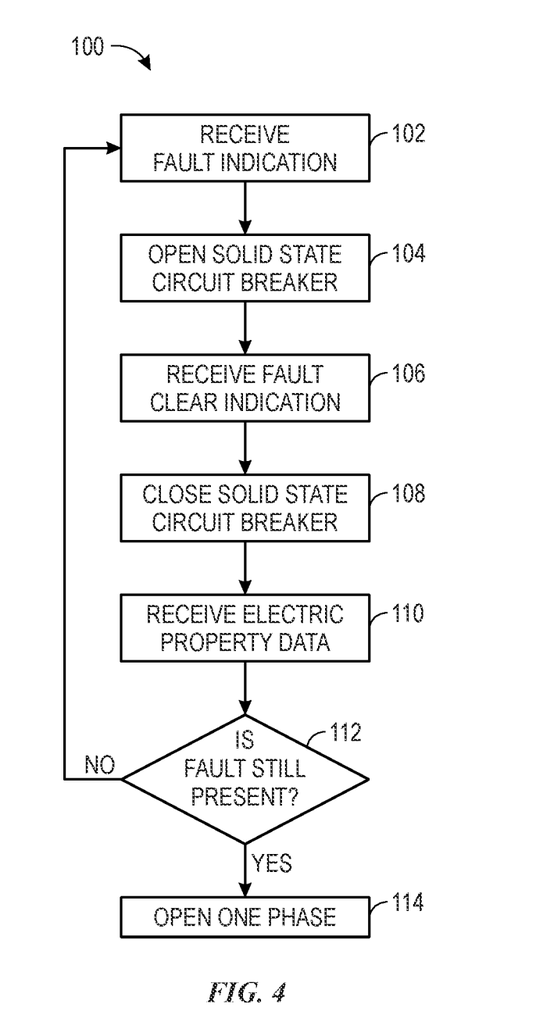
FIG. 4 illustrates a method for controlling the one or more contactors during a closing sequence of the solid-state circuit breaker, in accordance with an embodiment.

With the foregoing in mind, FIG. 4 illustrates a method 100 for controlling the one or more poles during a closing sequence of the solid-state circuit breaker 54. It should be noted that any suitable component that may control the components of the local control system 42 and/or the solid-state circuit breaker 54, such as the processor 62, may perform the method 100. In some embodiments, the method 100 may be implemented by executing instructions stored in a tangible, non-transitory, computer-readable medium, such as the memory 64 or storage 66, using the processor 62. While the method 100 is described using steps in a specific sequence, it should be understood that the present disclosure contemplates that the described steps may be performed in different sequences than the sequence illustrated, and certain described steps may be skipped or not performed altogether.

At block 102, the processor 62 may receive an indication or signal indicative of a fault present in the industrial automation system 10, a device coupled to the solid-state circuit breaker 54, or the like. The processor 62 may receive the indication that the fault is present from one or more components in the industrial automation system 10, such as the local control system 42. In some embodiments, the processor 62 may detect when one or more components in the industrial automation system 10 are not performing their respective functions correctly. That is, the processor 62 may receive data from the one or more sensors 59, components downstream and/or upstream from the solid-state circuit breaker 54, and the like to detect the presence of the fault. In some embodiments, the processor 62 may determine whether the received data corresponds to abnormal or unexpected data. The abnormal data may include current data, voltage data, and/or temperature data that include values that fall outside of expected ranges. In some embodiments, the abnormal data may be associated with an internal fault in one or more industrial automation devices 20.

At block 104, in response to receiving the fault indication, the processor 62 may send a signal to the solid-state circuit breaker 54 to open the semiconductor devices associated with the poles of the solid-state circuit breaker 54. That is, the processor 62 may send signals to gates of the semiconductor devices associated with the poles of the solid-state circuit breaker 54 to cause the semiconductor devices to open. By opening the semiconductor devices, galvanic isolation may be obtained between a line-side and a load-side of the solid-state circuit breaker 54, thereby preventing current flow through the solid-state circuit breaker 54.

At block 106, the processor 62 may receive an indication that the fault condition has been cleared. The processor 62 may receive the indication from the sources described above with respect to block 102, may generate the indication itself based on data analysis performed by the processor 62, or the like. It should be noted that the fault condition may correspond to any suitable fault condition, such as an overcurrent event, an overvoltage event, an internal fault of one or more industrial automation devices 20, an overheating event, short circuit event, a low impedance event, a condition between two phases of a device (e.g., solid-state circuit breaker 54), a condition between a phase of a device and ground, and the like.

At block 108, in response to receiving the indication that the fault condition is no longer present (e.g., cleared or resolved), the processor 62 may send a signal to one or more semiconductor devices associated with one or more poles of the solid-state circuit breaker 54 to close, thereby connecting a power source to a load device via the pole of the solid-state circuit breaker 54. In some embodiments, the multi-pole solid-state circuit breaker 54 may close such that the semiconductor devices may be closed in a particular order based on a delay or firing angle. That is, instead of closing each of the semiconductor devices at the same time, each semiconductor device may be closed after a delay to allow the processor 62 to perform certain sniffing operations and limit fault conditions from being experienced by other connected devices. By way of example, one phase may be coupled to the downstream devices to allow the processor 62 to determine whether the fault condition associated with the indication received at block 102 has been cleared, whether a new fault condition is present, or both.

In some embodiments, at block 108, the processor 62 may send signals to semiconductor devices associated with poles of the solid-state circuit breaker 54 to close according to certain firing angles, thereby connecting a power source to a load device via the poles of the solid-state circuit breaker 54 in a particular fashion. In this way, the processor 62 may use particular closing angles for the semiconductor devices to significantly reduce the amount of available current during a first half cycle of the current (e.g., before first current zero crossing) available to connected devices. Indeed, the processor 62 may determine whether a fault condition (e.g., line-to-line fault) is present after the semiconductor devices are closed according to the firing angles.

With this in mind, after closing the semiconductor devices according to the closing sequence or firing angles, at block 110, the processor 62 may receive electrical property data regarding one or more electrical properties of the solid-state circuit breaker 54, the poles of the solid-state circuit breaker 54, or the like. By connecting the power source to the load devices via the poles of the solid-state circuit breaker 54, the processor 62 may perform a sniffing (e.g., detection) operation to detect whether one or more fault conditions may be present in one or more industrial automation devices 20 upstream or downstream from the solid-state circuit breaker 54. By way of example, the processor 62 may detect whether a short circuit condition is present when the solid-state circuit breaker 54 performs the sniffing operation based on a line voltage (e.g., electrical property data) decreasing below a voltage threshold within a certain amount of time. In some embodiments, the sniffing operation may involve pulsing current to one or more industrial automation devices 20 downstream from the solid-state circuit breaker 54 by opening and closing various pole combinations of the solid-state circuit breaker 54 to verify that the fault condition is not present.

In another example, the solid-state circuit breaker 54 may detect a change in current (e.g., di/dt) during the sniffing operation based on the one or more industrial automation devices 20 upstream or downstream connecting to the solid-state circuit breaker 54. If the change in current is greater than a current threshold, the processor 62 may determine that the fault condition is present.

With this in mind, at block 112, the processor 62 may determine if a fault condition is present based on the electrical property data received at block 110. That is, if the electrical property data corresponds to expected electrical property data, is below threshold values, and the like, the processor 62 may determine that the fault condition is not present. In some embodiments, the processor 62 may confirm that the fault indications received at block 102 are no longer present based on information received from the data sources that provided the fault indication. If the processor 62 determines that any fault condition s still present, the processor 62 may proceed to block 114 and send a signal to cause the solid-state circuit breaker 54 to open one or more semiconductor devices. In this way, the processor 62 may open the one or more poles of the solid-state circuit breaker 54 to further limit the current (e.g., power) going into the downstream industrial automation devices 20.

In addition, if the processor 62 receives other fault indications from other devices as described above, the processor 62 may proceed to block 114 and send the signal to the solid-state circuit breaker 54 to open the semiconductor devices. As discussed above, by opening the semiconductor devices, galvanic isolation between the line-side and load-side may be attained, thereby halting power flow through the solid-state circuit breaker 54

Referring back to block 112, if the processor 62 determines that the fault condition is not present, the processor 62 may return to block 102. That is, the regular operation of the solid-state circuit breaker 54 may continue, allowing power or current to flow into the electrical load 56 from the power supply 52.

In some embodiments, various combinations of semiconductor devices may be closed to continue to perform various types of sniffing operation to detect various types of fault conditions (e.g., line-to-line faults). That is, after a fault is determined to be cleared at block 112, the processor 62 may cause the solid-state circuit breaker 54 to close different combinations of the poles to verify that additional fault conditions are not present.

In addition, at block 108, the processor 62 may cause the solid-state circuit breaker 54 to close the semiconductor devices in different orders each time the close operation is initiated after detecting a fault as described above. In this way, the processor 62 may limit the wear on any particular pole, semiconductor device, or the like.

It should be noted that the embodiments described herein may apply to both traditional electro-mechanical breakers and the solid-state circuit breaker 54. That is, in an electro-mechanical breaker, the arc current may be reduced if the contactors (e.g., the first contactor, the second contactor, and the third contactor) are opened during the first half-cycle of current. Furthermore, in the solid-state circuit breaker 54, the current through the semi-conductor before switching off may be significantly reduced by opening the respective semiconductor switch within the first half-cycle. Moreover, the transient recovery voltage across the semiconductor devices may be controlled and/or minimized since the contactors may be closed more quickly in the solid-state circuit breakers 54 as compared to the electro-mechanical breaker.

Figure 5A:
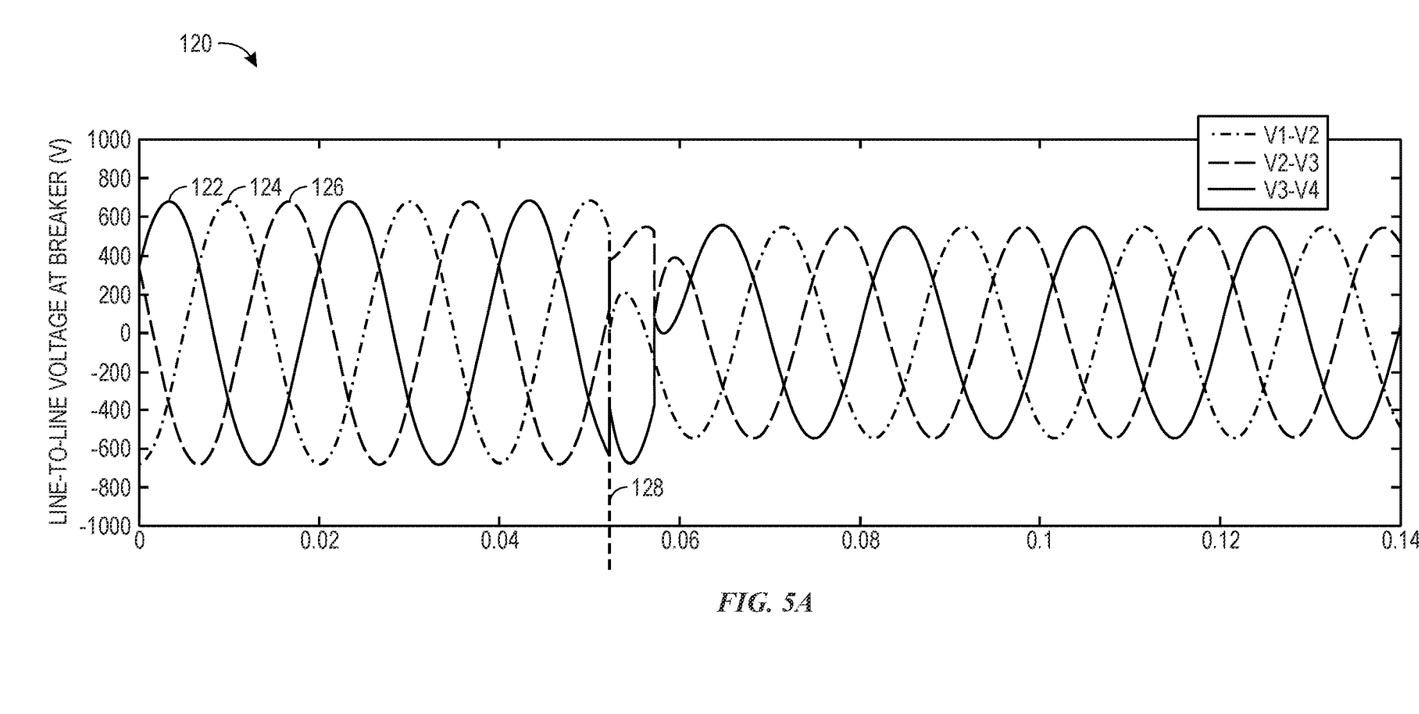
FIGS. 5A and 5B illustrates a short circuit response by one or more contactors of the solid-state circuit breaker during the coordinated closing of the one or more contactors of the solid-state circuit breaker, in accordance with an embodiment.
Figure 5B:
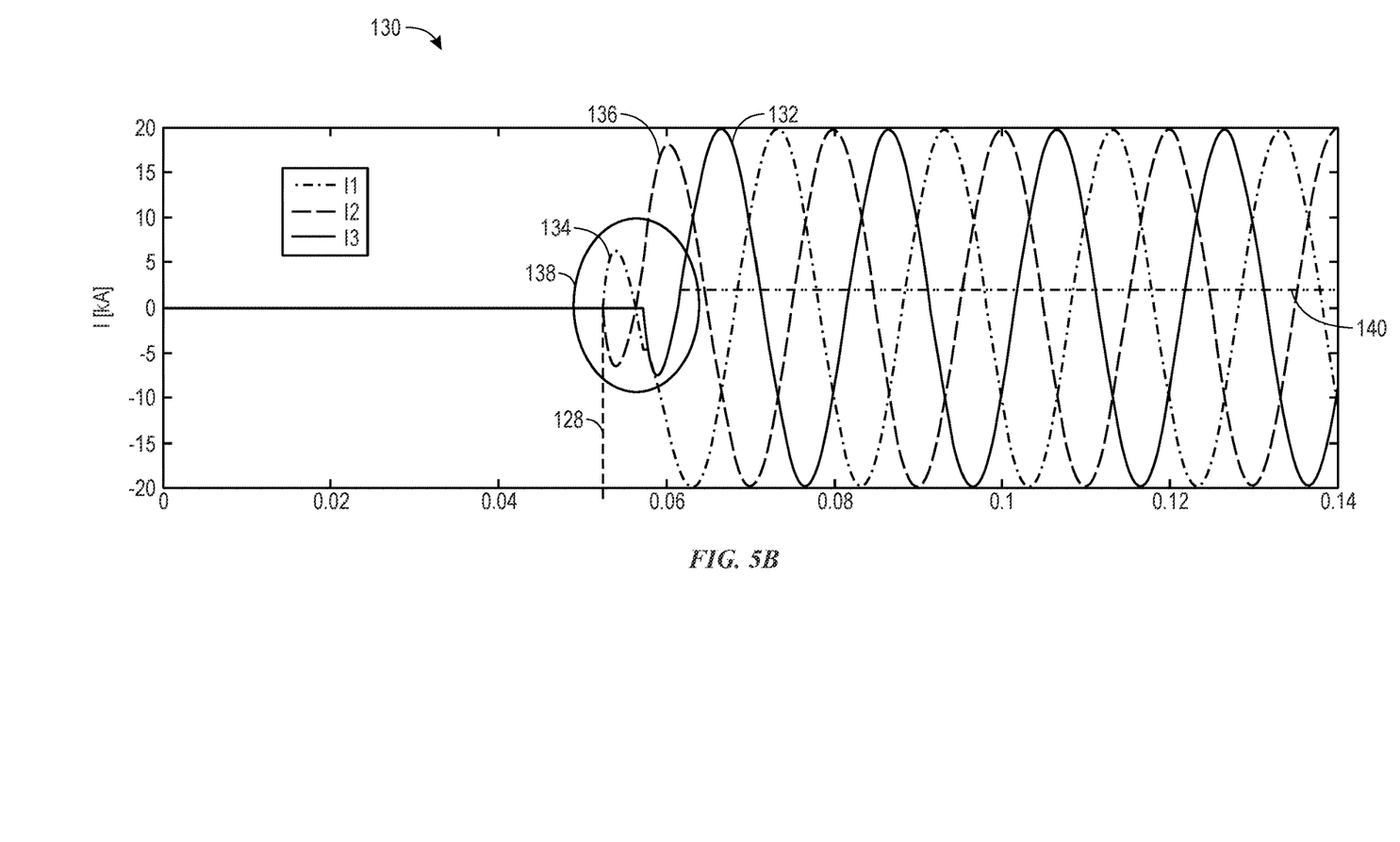

With the foregoing in mind, FIGS. 5A and 5B illustrate voltage and current waveforms of poles within the solid-state circuit breaker 54 during the coordinated closing (e.g., at adjusted firing angles) of the semiconductor devices of the solid-state circuit breaker 54, as discussed in the method 100. A graph 120 includes voltage over time waveforms (e.g., voltage curve 122, voltage curve 124, voltage curve 126), and graph 130 includes current over time waveforms (e.g., current curve 132, current curve 134, current curve 136). As shown in graph 120 of FIG. 5A and graph 130 of FIG. 5B, the voltage and current measurements during a close operation in which each of the multi-pole switches of the solid-state circuit breaker 54 are closed at different firing angles (e.g., $\alpha=130°$, $\beta=90°$, from first waveform) are different than the same measurements depicted in graphs 80 and 90 of FIGS. 3A and 3B in which the multi-pole switches of the solid-state circuit breaker 54 are closed at substantially the same time.

Referring first to the graph 120 of FIG. 5A, the voltage curves 122, 124, and 126 depicted represent line-to-line voltages between poles of the solid-state circuit breaker 54. In some embodiments, the graph 120 may illustrate a voltage measurement between each phase or pole of the solid-state circuit breaker 54 while performing a close operation during a short circuit event. That is, the solid-state circuit breaker 54 may be actively closing connecting downstream equipment to a power supply via multiple poles within the solid-state circuit breaker 54 while a short circuit event is present in the power supply, the downstream equipment, or both.

Referring now to the graph 130 of FIG. 5B, each pole of the solid-state circuit breaker 54 is open and not conducting current until time 128. At time 128, the solid-state circuit breaker 54 may close into a short circuit event, which may be present in a downstream component and/or an upstream component coupled to the solid-state circuit breaker 54. Following the time 128, the voltage curves 122, 124, and 126, each of which corresponds to the line-to-line voltage between two poles, may be altered due to the load devices being connected via the semiconductor devices of the solid-state circuit breaker 54 according to the sequence defined by the firing angles.

In the same manner, the current curves 132, 134, and 136 that are related to respective poles of the solid-state circuit breaker 54 may experience varying amounts of current during the closing sequence of the solid-state circuit breaker 54. However, since the semiconductor devices of the solid-state circuit breaker 54 are closed according to a sequence (e.g., not simultaneously), the peak currents available to connected devices within the first half cycle (e.g., region 138) are significantly lower than peak currents available to the connected devices when the semiconductor devices are closed simultaneously, as depicted in the region 98 of graph 90 in FIG. 3B. Indeed, if the processor 62 or other suitable device detects a fault condition within this first half-cycle, the semiconductor devices of the solid-state circuit breaker 54 may be opened, thereby providing no current (e.g., curve 140) to connected devices. As such, the amount of current available to each pole or connected device may be limited to preserve the operations and equipment of the connected devices and the solid-state circuit breaker 54. That is, by closing the poles at different times, the solid-state circuit breaker 54 may limit the available short circuit current available to downstream devices, thereby preserving the integrity of the downstream devices and the internal components (e.g., semiconductor devices) within the solid-state circuit breaker 54.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A system, comprising:
a solid-state circuit breaker configured to couple between a power supply and an electrical load;
one or more sensors configured to measure one or more properties associated with the solid-state circuit breaker, the electrical load, the power supply, or any combination thereof;
a control system configured to communicatively couple to the one or more sensors, wherein the control system is configured to:
receive a first set of data from the one or more sensors, wherein the first set of data is received while the solid-state circuit breaker is open;
send a first signal to the solid-state circuit breaker based on the first set of data, wherein the first signal is configured to cause the solid-state circuit breaker to:
turn on a first semiconductor device associated with a first pole in the solid-state circuit breaker at a first firing angle; and
turn on a second semiconductor device associated with a second pole in the solid-state circuit breaker at a second firing angle different from the first firing angle;
receive a second set of data from the one or more sensors after the first signal is sent to the solid-state circuit breaker; and
send a second signal to the solid-state circuit breaker based on the second set of data, wherein the second signal is configured to cause the solid-state circuit breaker to turn off the first semiconductor device and the second semiconductor device.

2. The system of claim 1, wherein the one or more sensors comprise one or more temperature sensors, one or more current sensors, one or more voltage sensors, or any combination thereof.

3. The system of claim 1, wherein the control system is configured to send the first signal in response to the first set of data corresponding to a fault condition being absent.

4. The system of claim 3, wherein the fault condition corresponds to a short circuit condition between a first phase of the solid-state circuit breaker and a second phase of the solid-state circuit breaker, between the first phase and ground, or both.

5. The system of claim 3, wherein the control system is configured to send the second signal in response to the second set of data corresponding to an additional fault condition being present.

6. The system of claim 5, wherein the additional fault condition comprises a short circuit event.

7. The system of claim 1, wherein the control system is configured to send the second signal within a half cycle of at least one current waveform received by the first pole or the second pole.

8. The system of claim 1, wherein the second firing angle corresponds to a delay with respect to the first firing angle.

9. A method, comprising:
receiving, via at least one processor, a first set of data indicative of a fault being present;
sending, via the at least one processor, a first signal to a breaker based on the first set of data, wherein the first signal is configured to cause the breaker to open a plurality of poles of the breaker;
receiving, via the at least one processor, a second set of data indicative of the fault being cleared; and
sending, via the at least one processor, a second signal to the breaker based on the second set of data, wherein the second signal is configured to cause the breaker to:
close a first pole of the plurality of poles at a first time; and
close a second pole of the plurality of poles at a second time different from the first time.

10. The method of claim 9, comprising:
receiving, via the at least one processor, a third set of data after the second signal is sent to the breaker; and
sending, via the at least one processor, a third signal to the breaker based on the third set of data, wherein the third signal is configured to cause the breaker to open the plurality of poles.

11. The method of claim 10, wherein the third set of data is indicative of an additional fault being present.

12. The method of claim 10, wherein the breaker is configured to open within a first half cycle of a current waveform received via the first pole or the second pole.

13. The method of claim 9, wherein the breaker comprises a solid-state circuit breaker comprising a first semiconductor device coupled to the first pole and a second semiconductor device coupled to the second pole.

14. The method of claim 9, wherein the breaker comprises an electro-mechanical breaker comprising a first contactor coupled to the first pole and a second contactor coupled to the second pole.

15. The method of claim 9, wherein the first set of data is received from a local control system.

16. The method of claim 9, wherein the second set of data is received from one or more sensors.

17. A non-transitory, machine-readable medium, comprising machine-readable instructions that, when executed by one or more processors, cause the one or more processors to:
receive a first set of data indicative of a fault being present;
send a first signal to a breaker based on the first set of data, wherein the first signal is configured to cause the breaker to open a plurality of poles of the breaker;
receive a second set of data indicative of the fault being cleared; and
send a second signal to the breaker based on the second set of data, wherein the second signal is configured to cause the breaker to:
close a first pole of the plurality of poles at a first time; and
close a second pole of the plurality of poles at a second time different from the first time.

18. The non-transitory, machine-readable medium of claim 17, wherein the first time corresponds to a first firing angle, and wherein the second time corresponds to a second firing angle different from the first firing angle.

19. The non-transitory, machine-readable medium of claim 18, wherein the breaker is configured to open within a first half cycle of a current waveform received via the first pole or the second pole.

20. The non-transitory, machine-readable medium of claim 18, wherein the breaker corresponds to a solid-state circuit breaker.

\* \* \* \* \*